United States Patent
Piper et al.

(10) Patent No.: US 7,525,823 B2
(45) Date of Patent: *Apr. 28, 2009

(54) SWITCH MODE POWER SUPPLY SYSTEMS

(75) Inventors: Johan Piper, Cambridgeshire (GB); David M. Garner, London (GB)

(73) Assignee: Cambridge Semiconductor Limited (GB)

(*) Notice: Subject to any disclaimer, the term of this patent is extended or adjusted under 35 U.S.C. 154(b) by 148 days.

This patent is subject to a terminal disclaimer.

(21) Appl. No.: 11/490,877

(22) Filed: Jul. 21, 2006

(65) Prior Publication Data

US 2008/0007982 A1    Jan. 10, 2008

(30) Foreign Application Priority Data

Jul. 7, 2006    (GB)    .................................. 06134936

(51) Int. Cl.
    *H02M 3/335*    (2006.01)
(52) U.S. Cl. ............... 363/21.16; 363/21.11; 363/21.18
(58) Field of Classification Search .............. 363/21.01, 363/21.07, 21.08, 21.09, 21.16, 21.17, 21.18, 363/97, 98, 127
See application file for complete search history.

(56) References Cited

U.S. PATENT DOCUMENTS

| 4,439,822 | A |   | 3/1984 | Cocconi |
| 4,672,516 | A |   | 6/1987 | Ney et al. |
| 5,463,662 | A | * | 10/1995 | Sutterlin et al. ............. 375/351 |
| 5,940,281 | A |   | 8/1999 | Wolf |
| 6,301,135 | B1 |  | 10/2001 | Mammano et al. |
| 6,333,624 | B1 |  | 12/2001 | Ball et al. |
| 6,373,726 | B1 |  | 4/2002 | Russell |
| 6,385,059 | B1 |  | 5/2002 | Telefus et al. |
| 6,590,789 | B2 |  | 7/2003 | Bailly |
| 6,625,042 | B2 |  | 9/2003 | Tolle et al. |
| 6,707,283 | B1 |  | 3/2004 | Ball |
| 6,721,192 | B1 |  | 4/2004 | Yang et al. |
| 6,781,357 | B2 |  | 8/2004 | Balakrishnan et al. |
| 6,833,692 | B2 |  | 12/2004 | Balakrishnan et al. |
| 6,836,415 | B1 |  | 12/2004 | Yang et al. |

(Continued)

FOREIGN PATENT DOCUMENTS

EP    0636889 A1    2/1995

(Continued)

OTHER PUBLICATIONS

U.S. Appl. No. 11/490,864, Restriction Requirement mailed Jul. 27, 2007, 6 pgs.

(Continued)

*Primary Examiner*—Rajnikant B Patel
(74) *Attorney, Agent, or Firm*—Schwegman, Lundberg & Woessner, P.A.

(57) ABSTRACT

Methods and apparatus for sensing the output current in a switch mode power supply (SMPS) using primary side sensing are described. A system includes a primary current sense input, a charge input to sense a charging time of an SMPS transformer; a discharge input to sense a discharging time of the transformer; at least one averager; and a calculator. The primary current is averaged by the averager over at least a switching cycle of the SMPS and the calculator estimates the output current of the SMPS using the averaged primary current, the charge signal and the discharge signal.

36 Claims, 6 Drawing Sheets

U.S. PATENT DOCUMENTS

| | | | |
|---|---|---|---|
| 6,842,350 | B2 | 1/2005 | Yamada et al. |
| 6,853,563 | B1 | 2/2005 | Yang et al. |
| 6,862,194 | B2 | 3/2005 | Yang et al. |
| 6,862,198 | B2 | 3/2005 | Muegge et al. |
| 6,882,552 | B2 | 4/2005 | Telefus et al. |
| 6,900,995 | B2 | 5/2005 | Muegge et al. |
| 6,956,750 | B1 | 10/2005 | Eason et al. |
| 6,958,920 | B2 | 10/2005 | Mednik et al. |
| 6,972,969 | B1 | 12/2005 | Shteynberg et al. |
| 6,977,824 | B1 | 12/2005 | Yang et al. |
| 6,985,368 | B2 | 1/2006 | Park |
| 6,999,324 | B2 | 2/2006 | Feldtkeller |
| 7,016,204 | B2 | 3/2006 | Yang et al. |
| 7,027,312 | B2 | 4/2006 | Park |
| 7,088,599 | B1 | 8/2006 | Muska et al. |
| 7,288,924 | B2 * | 10/2007 | Trandafir et al. ............ 323/283 |
| 7,342,812 | B2 | 3/2008 | Piper et al. |
| 2002/0015315 | A1 | 2/2002 | Telefus |
| 2004/0174209 | A1 | 9/2004 | Makino et al. |
| 2004/0196936 | A1 | 10/2004 | Kawama et al. |
| 2005/0024898 | A1 | 2/2005 | Yang et al. |
| 2005/0073862 | A1 | 4/2005 | Mednik et al. |
| 2005/0169017 | A1 | 8/2005 | Muegge et al. |
| 2005/0276083 | A1 | 12/2005 | Berghegger |
| 2005/0285587 | A1 | 12/2005 | Yang et al. |
| 2006/0034102 | A1 | 2/2006 | Yang et al. |
| 2006/0050539 | A1 | 3/2006 | Yang et al. |
| 2006/0055433 | A1 | 3/2006 | Yang et al. |
| 2006/0056204 | A1 | 3/2006 | Yang et al. |
| 2006/0077697 | A1 | 4/2006 | Yang |
| 2007/0121349 | A1 | 5/2007 | Mednik et al. |
| 2007/0133234 | A1 | 6/2007 | Huynh et al. |
| 2008/0007977 | A1 | 1/2008 | Piper et al. |
| 2008/0137380 | A1 | 6/2008 | Piper et al. |

FOREIGN PATENT DOCUMENTS

| | | |
|---|---|---|
| WO | WO-86/03902 A1 | 7/1986 |
| WO | WO-03/047079 A2 | 6/2003 |
| WO | WO-2004/051834 A1 | 6/2004 |
| WO | WO-2004/082119 A2 | 9/2004 |
| WO | WO-2004/112226 A1 | 12/2004 |
| WO | WO-2004/112227 A1 | 12/2004 |
| WO | WO-2004/112229 A1 | 12/2004 |
| WO | WO-2005/011095 A1 | 2/2005 |
| WO | WO-2005/048442 A1 | 5/2005 |
| WO | WO-2006/067522 A2 | 6/2006 |
| WO | WO-2006/067523 A2 | 6/2006 |
| WO | WO-2007/003967 A2 | 1/2007 |

OTHER PUBLICATIONS

U.S. Appl. No. 11/490,864, Response to Restriction Requirement filed Aug. 16, 2007, 7 pgs.

Coulson, D. R., et al., "Switch Mode Power Supply Controllers", U.S. Appl. No. 11/445,473, filed Jun. 1, 2006.

Garner, D. M., et al., "Switch Mode Power Supply Controllers", U.S. Appl. No. 11/445,482, filed Jun. 1, 2006.

Indika De Silva, M. D., et al., "Switch Mode Power Supply Controllers", U.S. Appl. No. 11/810,739, filed Jun. 7, 2007.

Lalithambika, V. A., et al., "Switch Mode Power Supply Controllers", U.S. Appl. No. 11/445,476, filed Jun. 1, 2006.

Piper, J., et al., "Switch Mode Power Supply Systems", U.S. Appl. No. 11/490,864, filed Jul. 21, 2006.

"U.S. Appl. No. 11/490,864, Response filed Oct. 1, 2007 to Non-Final Office Action mailed Sep. 7, 2007", 8 pgs.

"U.S. Appl. No. 11/490,864, Non-Final Office Action mailed Sep. 7, 2007", 6 pgs.

"U.S. Appl. No. 11/490,864, Notice of Allowance mailed Oct. 12, 2007", 4 pgs.

"Partial Search Report for PCT Application No. PCT/GB2007/050388", (Oct. 2007), 1 pg.

"U.S. Appl. No. 11/490,864, Supplemental Notice of Allowability mailed Jan. 16, 2008", 5 pgs.

"Partial International Search Report for PCT Application No. PCT/GB2007/050387 mailed Oct. 16, 2007", 4 pgs.

* cited by examiner

SWITCH MODE POWER SUPPLY SYSTEMS

RELATED APPLICATION

This application claims priority under 35 U.S.C. 119 from United Kingdom Application No. 0613493.6 filed 7 Jul. 2006, which application is incorporated herein by reference.

FIELD OF THE INVENTION

This invention generally relates to methods and apparatus for sensing the output current in a switch mode power supply (SMPS), in particular using primary side sensing.

BACKGROUND TO THE INVENTION

Improved techniques are described, which enable the design of a Switch Mode Power Supply with a relatively accurately controlled output current limit which, in embodiments, do not need current sensing components on the secondary side of the power supply.

Many SMPS applications require the output current to be either limited to, or maintained at a particular value. One way of achieving this is by including some form of output current sensing, located on the secondary side of the converter, communicating this information back to the power converter controller located on the primary side. This provides an accurate method of current sensing but incurs the cost of additional secondary side components.

A relatively crude current limiting may be implemented by monitoring and limiting the primary side switch current to a particular value. The accuracy may be improved by sensing and integrating the current through the primary switch, correlating the time constant of the integrator to the switching period, in this way estimating the output current. However, the accuracy of output current sensing in this way is dependent, among other things, upon the efficiency of power conversion, the switching time of the switch and the like.

Background prior art relating to SMPS output current control can be found in: U.S. Pat. No. 6,833,692: Method and apparatus for maintaining an approximate constant current output characteristic in a switched mode power supply; U.S. Pat. No. 6,781,357: Method and apparatus for maintaining a constant load current with line voltage in a Switch Mode Power Supply; Full-Text Control circuit for controlling output current at the primary side of a power converter; U.S. Pat. No. 6,977,824: Control circuit for controlling output current at the primary side of a power converter; U.S. Pat. No. 6,862,194: Flyback power converter having a constant voltage and a constant current output under primary-side PWM control; U.S. Pat. No. 6,853,563: Primary-side controlled flyback power converter; U.S. Pat. No. 6,625,042: Power supply arrangement comprising a DC/DC converter with primary-side control loop; U.S. Pat. No. 7,016,204: close-loop PWM controller for primary-side controlled power converters; and EP 0 636 889A. This latter document asserts that the average current flowing through the power switch (of an SMPS) during its conduction interval is substantially proportional to the output current of the power supply, with the proportionality factor precisely known and constant, but this is in fact true only for certain SMPS topologies, e.g. the forward converter as described in the aforementioned patent.

Improved techniques for sensing the output current of an SMPS, and for measuring the output current by means of primary side sensing are described.

SUMMARY OF THE INVENTION

According to an embodiment of the present invention there is therefore provided a system for estimating the output current of a Switch Mode Power Supply (SMPS), the SMPS including a transformer with at least a primary winding coupled to an input of the SMPS and a secondary winding coupled to an output of the SMPS and having a power switching device to switch power to the primary winding of the transformer, the system including: a primary current sense input to sense a primary current in the primary winding of the transformer; a charge signal input to sense a charge signal dependent on a charging time of the transformer; a discharge signal input to sense a discharge signal dependent on a discharging time of the transformer; at least one averager; and a calculator; wherein the primary current is averaged by the averager over at least a switching cycle of the SMPS; and wherein the calculator estimates the output current of the SMPS using the averaged primary current, the charge signal and the discharge signal; and wherein the calculator estimates the output current of the SMPS using the averaged primary current, the charge signal and the discharge signal.

Broadly speaking in embodiments, the system determines the average current into the primary side of the transformer or similar magnetic energy storage device over a switching cycle of the SMPS, during which the transformer is first "charged", that is building up energy stored in a magnetic field, prior to being discharged on the secondary side. The system may also determine the average current into the primary side of the transformer over many switching cycles of the SMPS, which is then multiplied by a quotient of the secondary side discharge time by the primary side charge time, that is multiplying the result by $T_{discharge}/T_{charge}$.

In embodiments the averager is implemented using a low-pass filter to average a current sense input signal, for example a voltage across a current sense resistor or in some other way, for example using a current sensing transformer. In embodiments, the low-pass filters may be implemented using a switched capacitor circuit. In embodiments the multiplying is performed using a delta-sigma circuit or a translinear circuit.

The secondary side discharge time may be determined using one of a range of methods, examples of which are described later. However in embodiments the discharge time may be determined by a timing signal generator, which includes a comparator to compare the voltage sensed from the primary or from an auxiliary winding of the transformer with a reference to generate a timing signal. The reference may either be a fixed reference, for example a zero crossing, or may include a reference from an output voltage model for the SMPS, or some other reference.

An embodiment, of the invention further provides q method of estimating the output current of a Switched Mode Power Supply (SMPS), the SMPS including a transformer with at least a primary winding coupled to an input of the SMPS and a secondary winding coupled to an output of the SMPS and having a power switching device to switch power to the primary winding of the transformer, the method including: sensing a primary current in the primary winding of the transformer; sensing a charge signal that depends on a charging time of the transformer; sensing a discharge signal that depends on a discharging time of the transformer; averaging the primary current over at least a switching cycle of the SMPS; and calculating the output current of the SMPS using each of the averaged primary current, the charge signal, the discharge signal.

An embodiment of the invention also provides a system for producing an error signal for controlling the output current of a Switch Mode Power Supply (SMPS), the SMPS including a transformer with at least a primary winding coupled to an input of the SMPS and a secondary winding coupled to an output of the SMPS and having a power switching device to switch power to the primary winding of the transformer, the system including: a primary current sense input to sense a primary current in the primary winding of the transformer; a charge signal input to sense a charge signal dependent on a charging time of the transformer; a discharge signal input to sense a discharge signal depending on a discharging time of the transformer; a desired output current signal input to sense a desired output current; at least one averager; and a calculator; wherein the primary current is averaged by the averager over a switching cycle of the SMPS, and wherein the calculator produces an error signal using the averaged primary current, the charge signal, the discharge signal and the desired output current.

An embodiment, of the invention yet further provides a method for producing an error signal for controlling the output current of a Switch Mode Power Supply (SMPS), the SMPS including a transformer with at least a primary winding coupled to an input of the SMPS and a secondary winding coupled to an output of the SMPS and having a power switching device to switch power to the primary winding of the transformer, the method including: receiving a primary current in the primary winding of the transformer; receiving a charge signal, the charge signal depending on a charging time of the transformer; receiving a discharge signal, the discharge signal depending on a discharging time of the transformer; receiving a desired output current input signal; averaging the primary current over at least a switching cycle of the SMPS; and calculating an error signal for controlling the output current of the SMPS using each of the averaged primary current, the charge signal, the discharge signal and the desired output current signal.

An embodiment of the invention further provides an SMPS controller including a system for producing an error signal as described above. In some embodiments the control module has a zero which is configured to suppress a pole of the output current estimating module, more particularly a pole of a low-pass filter in the estimating module. In embodiments this helps to simply the control loop and hence facilitates achieving improved SMPS control.

An embodiment of the invention further provides a system for regulating the output current of a Switch Mode Power Supply, including: means for calculating an error signal using an averaged primary current signal from a primary winding of a transformer comprising the SMPS, a charge signal depending on the charging time of the primary winding of the transformer, a discharge signal dependent on a discharging time of the secondary winding of the transformer, and a desired output current input signal; means for regulating the output current of a SMPS in response to the error signal.

An embodiment of the invention also provides a Switch Mode Power Supply (SMPS), including: a transformer having at least a primary winding coupled to an input of the SMPS and a secondary winding coupled to an output of the SMPS; a switch that electrically couples and decouples the primary winding of the transformer to a power source; and a system according to any one of claims 12 to 21, wherein the switch is controlled in response to the error signal produced by the system in order to control the current coupled to the output of the SMPS.

An embodiment of the invention also provides a multiplier and divider for use in a Switch Mode Power Supply (SMPS) including: a plurality of inputs for receiving a plurality of input signals; an output; a dividing stage receiving at least two input signals, the dividing stage being adapted to generate a divided signal that represents a quotient of the at least two input signals; and a multiplying stage receiving at least one other input signal and being adapted to multiply the at least one other input signal by the divided signal, wherein the divider stage includes a delta-sigma circuit having an integrator, a quantiser and a feedback path, the delta-sigma circuit being arranged and adapted to generate the divided signal.

Embodiments of the invention may be employed with a wide variety of SMPS topologies including, but not limited to, a flyback converter and a direct-coupled boost converter. The transformer may comprise a conventional transformer or an auto-transformer and the secondary side voltage may be sensed either on the primary winding (for example, using a potential divider where this voltage is high) or using an auxiliary winding on the transformer.

The SMPS may operate in either a Discontinuous Conduction Mode (DCM) or in a Continuous Conduction Mode (CCM) or at the boundary of the two, in a Critical Conduction Mode.

In a related aspect the invention provides a method of estimating an output current in an SMPS, said SMPS including a transformer with a least a primary winding coupled to an input of the SMPS and a secondary winding coupled to an output of the SNPS, the method including: sensing a current in said primary winding of said transformer; averaging a signal from said sensed current over a period when current is flowing in said primary winding to provide an average current signal; determining an estimate of a discharge time of current through said secondary winding of said transformer; and scaling said average current signal using said discharge time to estimate said SMPS output current.

The skilled person will understand that the above-described aspects and embodiments of the invention may be implemented using either digital or analogue hardware or a combination of the two. However some preferred embodiments are particularly convenient for substantially analogue implementation.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Broadly speaking, we will describe techniques for estimating current on the secondary side of a transformer in a switched mode power supply (SMPS) using low-pass filters. The techniques we describe average the primary-side current. The techniques may also average the charge and discharge signals.

In embodiments the technique uses a sigma-delta analogue-to-digital converter to estimate the current on the secondary side of a transformer in a switched-mode power-supply by multiplying the average of the primary-side current with the quotient of the discharge-time (on the secondary side) by the charge-time (on the primary side). Preferably, the drive signal is used for sensing the charge-time, the current on the primary side is used for sensing the average of the primary current and the reflected voltage from the secondary winding is used for sensing the discharge-time on the secondary side. In alternative embodiments, the charge-time is sensed by sending the drive signal and sensing a zero-crossing in a winding on the primary side.

Figure 1:
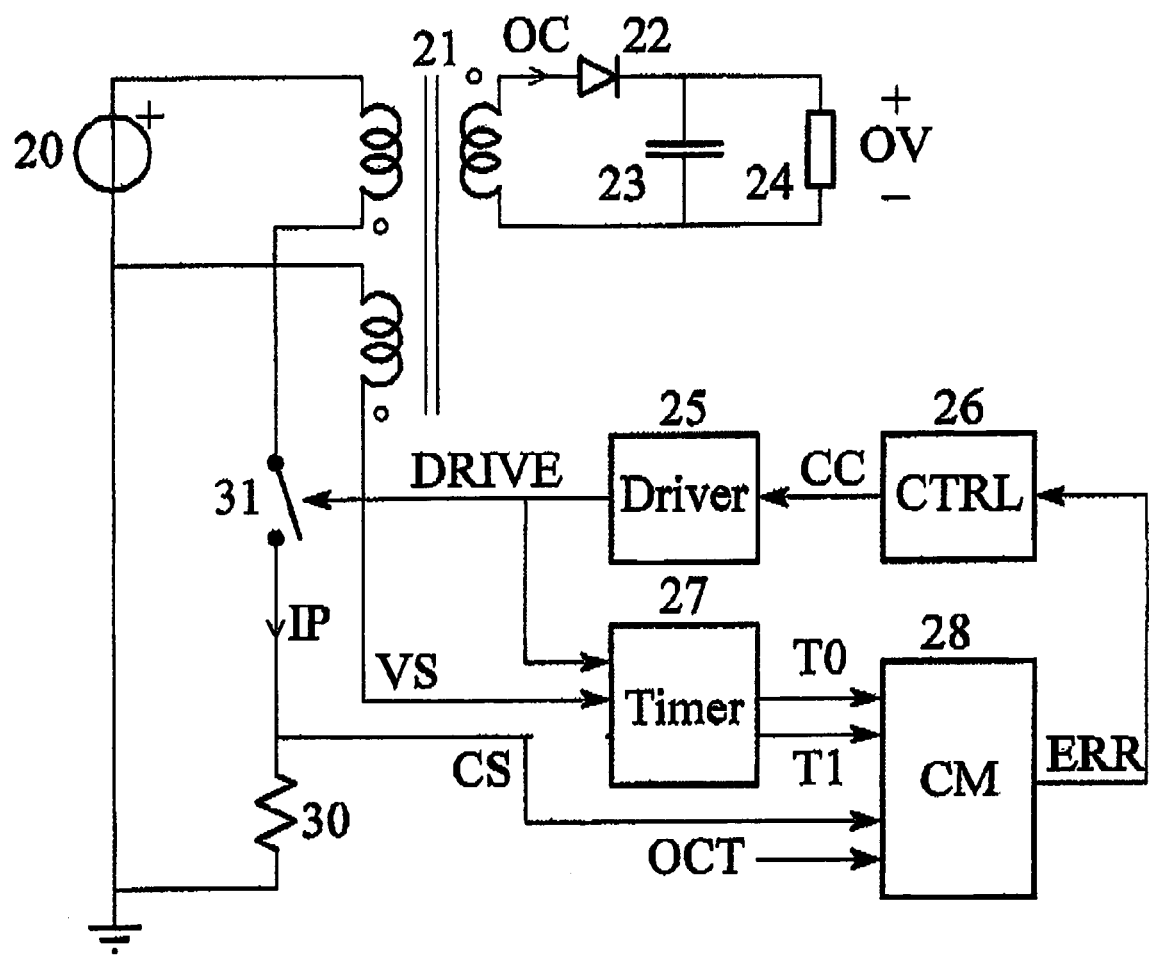
FIG. 1 shows an example of a switch mode power supply incorporating an embodiment of an SMPS error signal generating system according to the invention.

Referring to FIG. 1, this shows the simplified block diagram of a typical single-switch flyback SMPS. A DC source 20 is connected to the primary winding of a transformer 21 in series with a primary side switch 31 and a current sensing resistor 30. The secondary winding of the transformer 21 is connected to an output diode 22 in series with a capacitor 23. A load 24 is connected across the output capacitor 23. An auxiliary winding on the transformer 21 is connected between the negative terminal of the DC supply 20 and the timer 27 generating the voltage-sense signal VS. The primary current IP produces a voltage across resistor 30, generating the current-sense signal CS. The Driver 25 controls the on-times and the off-times of the switch 31 with the DRIVE signal.

The timer block 27 generates two timing signals, $T_0$ and $T_1$, by sensing the DRIVE and VS signals. $T_0$ represents the charge-time, i.e. the time when a current is flowing through the primary side of the transformer 21. $T_1$ represents the discharge-time, i.e. the time when a current is flowing through the secondary side of the transformer 21.

The signals $T_0$, $T_1$, CS, and OCT are used in the current model (CM) block 28 to produce an error signal, ERR. The (constant) OCT signal represents the target output current of the secondary winding. The ERR signal is a difference between OCT and the output current OC. The ERR signal is then used in the control block 26 to control the Driver 25 in such a way that the error signal ERR converges towards zero.

Figure 2:
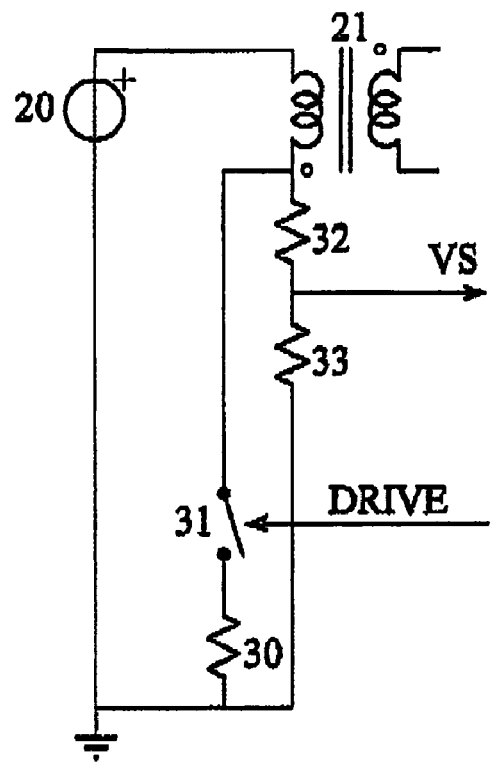
FIG. 2 shows an alternative voltage sensing arrangement for the SMPS of FIG. 1.
Figure 3:
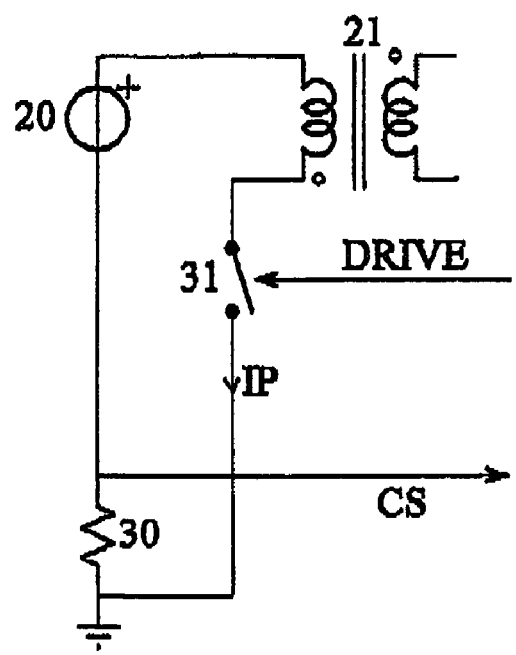
FIG. 3 shows an alternative current sensing arrangement for the SMPS of FIG. 1.

One alternative way to sense the current is to put the current sensing resistor 31 in the return path, as shown in FIG. 3. This configuration is particularly advantageous when switch 31 is a bipolar device; with the current sensing resistor in the return path, the primary current is being measured directly. One alternative way to sense the voltage is use a resistive divider (resistors 32 and 33) on the primary, as shown in FIG. 2, thus eliminating the auxiliary winding.

Timer Block

Figure 4:
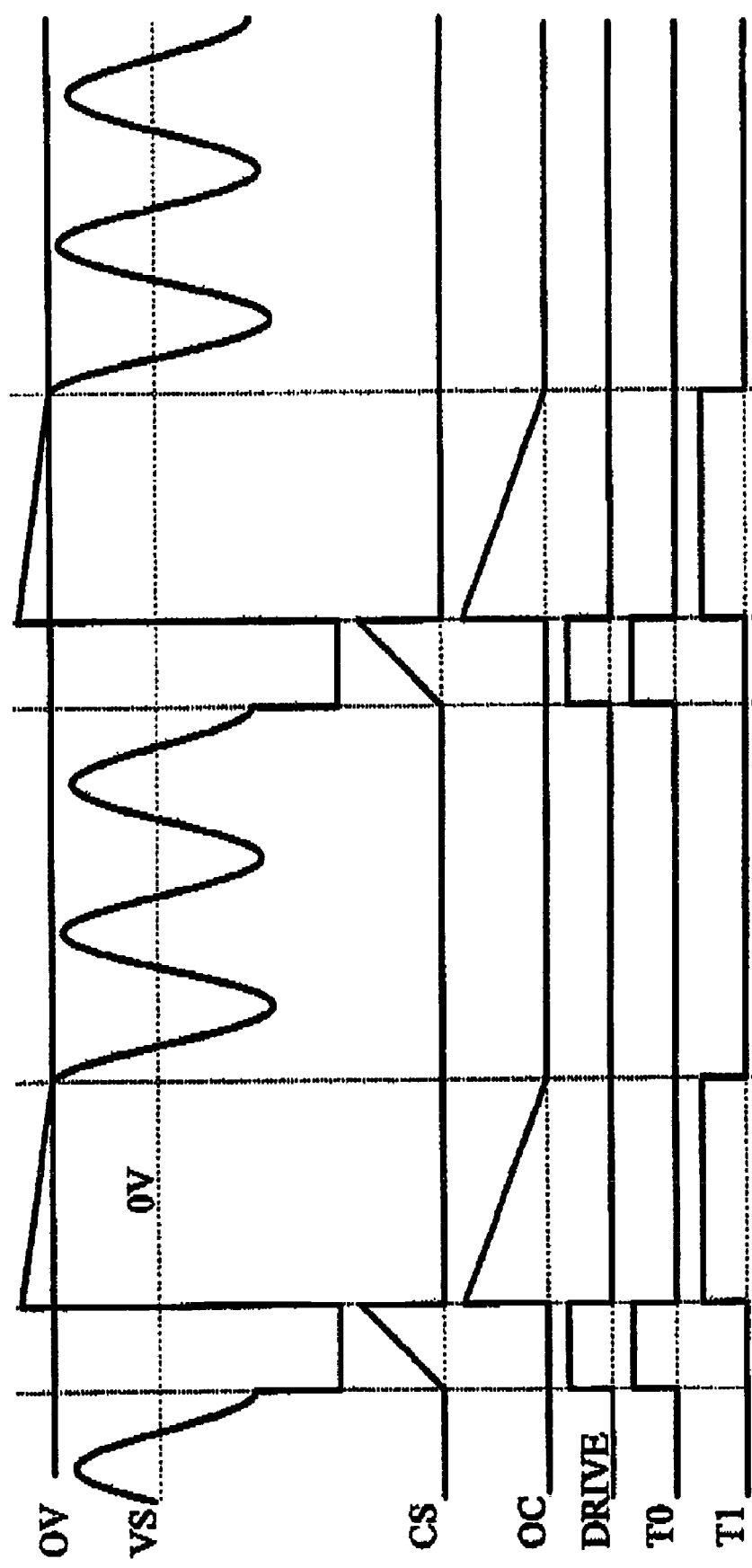
FIG. 4 shows a set of waveforms illustrating the operation of the SMPS of FIG. 1.

The timer block 27 generates two timing signals, $T_0$ and $T_1$, by sensing the DRIVE and VS signals. $T_0$ represents the charge-time, i.e. the time when a current is flowing through the primary side of the transformer 21. $T_1$ represents the discharge-time, i.e. the time when a current is flowing through the secondary side of the transformer 21. The waveforms of the signals are plotted in FIG. 4.

Figure 5:
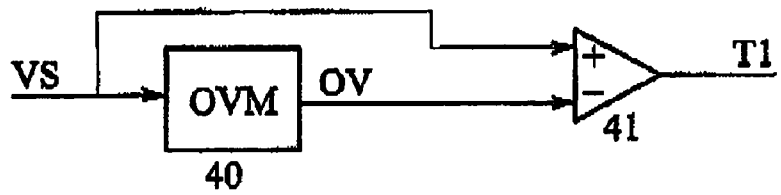
FIG. 5 shows an example implementation of the timing signal generator (timer) module of FIG. 1.

FIG. 5 shows one example implementation of the timer. In this example, DRIVE is used directly for generating $T_0$ and the reflected secondary-side voltage sensed on the auxiliary (or primary) winding of transformer 21 is used to generate the discharge-time signal $T_1$. It is preferable to employ primary-side sensing for the discharge time since this enables the construction of an SMPS in which only primary-side sensing is employed. Nonetheless, in other embodiments secondary-side sensing may be employed to determine the discharge time.

FIG. 5 shows one way in which the discharge time may be determined, using an output voltage model (OVM) block 40, which has an output, OV, which approximated the output voltage of the SMPS (see FIG. 4) and which can be compared with the sensed voltage signal VS by comparator 41 to generate signal $T_1$. In general, an SMPS controller which incorporates primary-side sensing for output voltage regulation will already include some form of output voltage model.

A simple alternative to the use of an output voltage model per se is simply to compare the sensed voltage waveform with a reference level in order generate the discharge-time signal $T_1$.

Some further techniques are described that may be used to generate $T_1$. Referring again to FIG. 4 (DCM mode) it can be seen that the OC waveform falls to zero at the knee in the curve of VS (auxiliary winding voltage) against time. This is also the time at which the secondary side current falls to zero. Following this point VS exhibits ringing, first passing through zero at a point, a quarter of a cycle of the ringing on (later) from the knee point. The knee of the VS curve can be identified, for example using the techniques described in PCT/GB2005/050242 (incorporated by reference); or the zero crossing can be identified and (for example by keeping sampled values of VS in a shift register) the point a quarter of a ringing cycle before this can be identified to generate a transition of $T_1$ (once the period of the ringing cycle has been measured); or $T_1$ may be initiated by the opening of the power switch (signal $T_0$) and terminated by the first zero crossing, which approximates the true knee position.

Output Current Model Theory

It is helpful first to consider some theory underlying embodiments of the invention.

Figure 12:
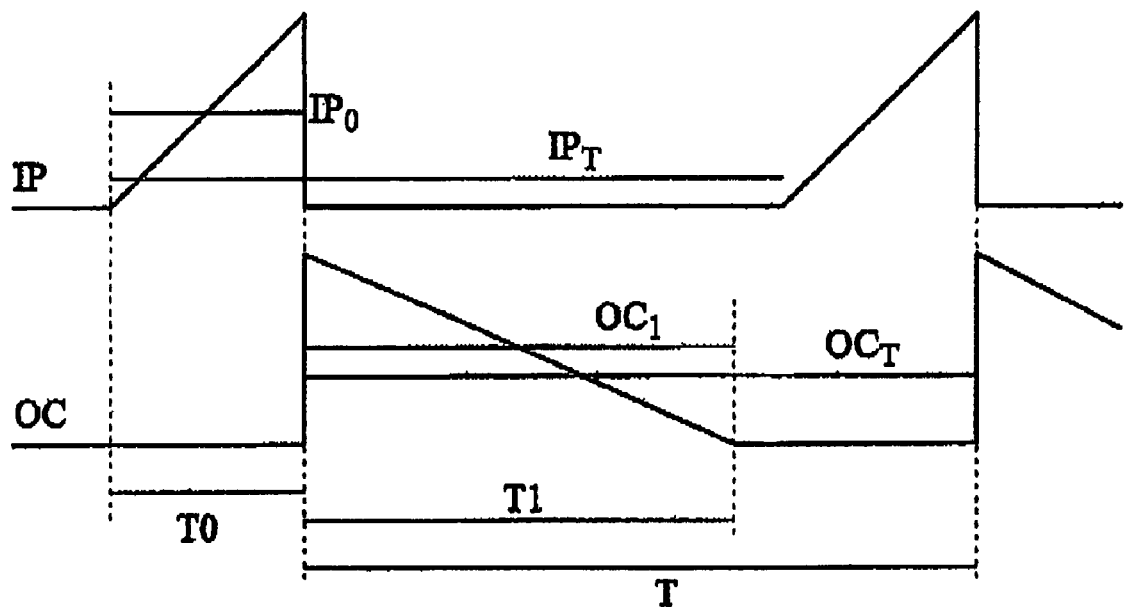
FIG. 12 shows primary-side charge and secondary-side discharge waveforms for an SMPS as shown in FIG. 1 operating in a Discontinuous Conduction Mode (DCM), illustrating average primary- and secondary-side currents.

The relation between the primary and the secondary winding of the transformer 21 can be used for estimating the output current. A plot of the input (IP) and output (OC) currents is shown in FIG. 12. The average of the current in the primary winding during $t_0$ ($IP_0$) equals the average of the current in the secondary winding during $t_1$ ($OC_1$):

$$nIP_0 = n\frac{1}{T0}\int_{T0} IP\,dt = \frac{1}{T1}\int_{T1} OC\,dt = OC_1 \qquad \text{Equation 1}$$

where n is the turns-ratio between the secondary and primary winding (i.e. number of primary turns divided by the number of secondary turns). The average output current for the whole (SMPS) period T ($OC_T$) is:

$$OC_T = \frac{1}{T}\int_{T_1} OC\,dt = OC_1\frac{T1}{T} = nIP_0\frac{T1}{T} \qquad \text{Equation 2}$$

The average output current also can be rewritten in terms of the average input current over period T, $IP_T$ using the equality:

$$IP_0 = \frac{1}{T0}\int_{T0} IP\,dt = \frac{T}{T0}\frac{1}{T}\int_T IP\,dt = \frac{T}{T0}IP_T \qquad \text{Equation 3}$$

Now the average output current can be calculated from:

$$OC_T = nIP_0\frac{T1}{T} = nIP_T\frac{T1}{T0} \qquad \text{Equation 4}$$

Current Model Block

Returning now to the CM block 28, the equation for estimating the output current is:

$$OCM = \frac{<CS> \cdot <T_1>}{<T_0>} \qquad \text{Equation 5}$$

where <CS> is the average of the current sense signal, <$T_1$> is the average of a discharge signal depending on the discharge time and <$T_0$> is the average of a charge signal depending on the charge time. Averages are taken over at least a whole SMPS period T. Alternatively, $T_1$ and $T_0$ may replace <$T_1$> and <$T_0$> respectively to estimate the output current.

Figure 6:
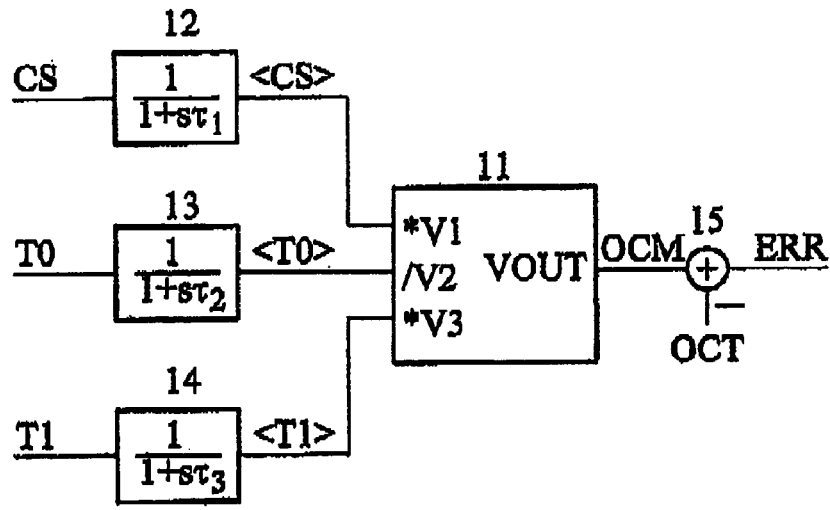
FIG. 6 shows an example implementation of the current model (CM) module of FIG. 1 using low-pass filters.

Equation 5 is used to implement an error function, the results of which can be used to control the output current of the SMPS. There are three ways to implement the error function; all of which can be used for the controlling the output current:

The first implementation of the error function is shown in FIG. 6. The error function for the first implementation is:

$$ERR = \frac{<CS> \cdot <T1>}{<T0>} - OCT \qquad \text{Equation 6}$$

In this implementation, CS, $T_0$, and $T_1$ are fed through respective low-pass filters 12, 13 and 14, to generate the average of the three signals: <CS>, <$T_0$>, and <$T_0$>. The averaged signals are used in the multiplier/divider 11 to produce OCM. OCM is then compared to the output current target OCT in 15 to produce the error signal ERR.

As discussed above, <$T_1$> and <$T_0$> can be replaced by $T_1$, and $T_0$ respectively. If $T_1$, and $T_0$ are used instead of <$T_0$> and <$T_0$>, low-pass filters 13 and 14 are removed from the implementation.

Figure 7:
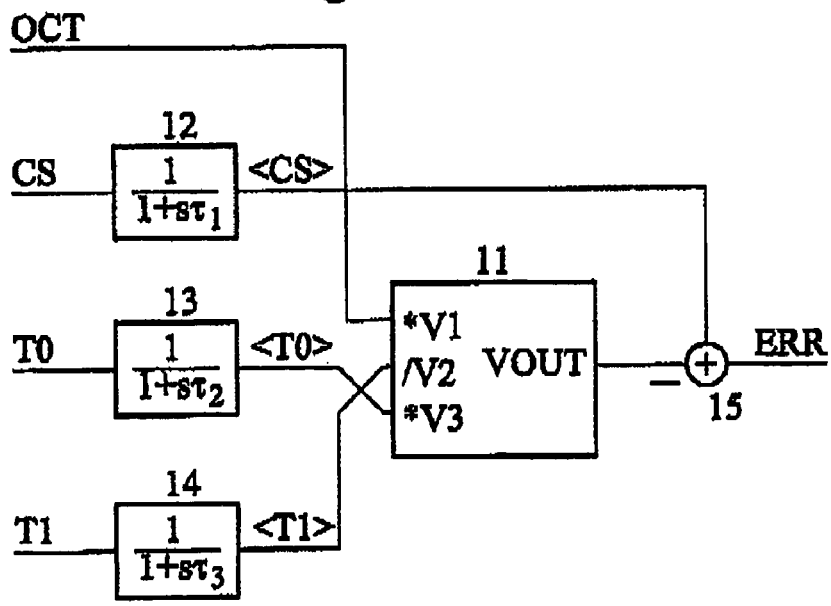
FIG. 7 shows a first alternative implementation of the current model (CM) module of FIG. 1 using low-pass filters.

The second implementation of the error function is shown in FIG. 7. By multiplying the right-hand side of Equation 6 by <$T_0$>/<$T_1$> the error signal becomes:

$$ERR = <CS> - \frac{OCT \cdot <T0>}{<T1>} \qquad \text{Equation 7}$$

The difference in this implementation that <$T_0$> and <$T_1$> have been switched on the input of the multiplier/divider 11. Also OCT and <CS> have been switched. In this implementation the signal path carrying $OC_T$ is subtracted from <CS> in 15.

As will be appreciated, the ERR signal produced in the second implementation will differ in absolute value to the ERR signal produced in the first implementation. However, as will be described later, the absolute value of the ERR signal does not adversely affect the operation of the surrounding circuitry.

As discussed above, <$T_1$> and <$T_0$> can be replaced by $T_1$, and $T_0$ respectively. If $T_1$, and $T_0$ are used instead of <$T_1$> and <$T_0$>, low-pass filters 13 and 14 are removed from the implementation.

Figure 8:
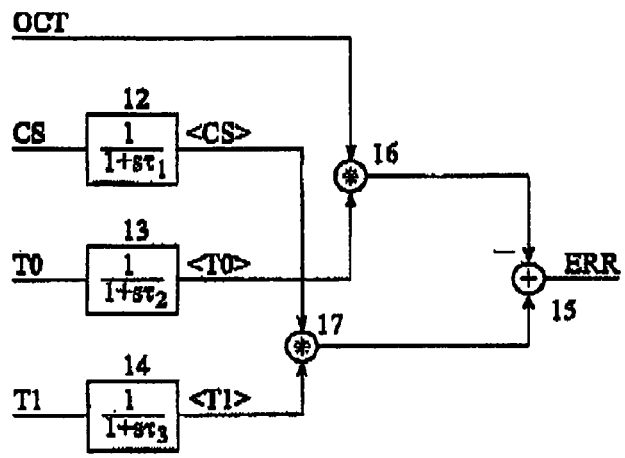
FIG. 8 shows a second alternative implementation of the current model (CM) module of FIG. 1 using low-pass filters.

The third implementation of the error function is shown in FIG. 8. The right-hand side of Equation 6 can be multiplied by <$T_0$> in order to avoid the need for a division operation. The error signal becomes:

$$ERR = <CS> \cdot <T1> - OCT \cdot <T0> \qquad \text{Equation 8}$$

In this implementation, the multiplier/divider 11 has been replaced by two multipliers, 16 and 17. In this implementation the signal path carrying OCT is subtracted in 15.

As will be appreciated, the ERR signal produced in the third implementation will differ in absolute value to the ERR signal produced in the first and second implementations. However, as will be described later, the absolute value of the ERR signal does not adversely affect the operation of the surrounding circuitry.

As discussed above, <$T_1$> and <$T_0$> can be replaced by $T_1$, and $T_0$ respectively. If $T_1$, and $T_0$ are used instead of <$T_1$> and <$T_0$>, low-pass filters 13 and 14 are removed from the implementation.

The low-pass filters 12, 13, and 14 may be implemented using a variety of techniques. For example using switched-capacitor filters.

Multiplier/Divider Block

There are many alternative implementations of the multiplier/divider block. Two implementations are a delta-sigma (ΔΣ) circuit and a translinear circuit.

Figure 9:
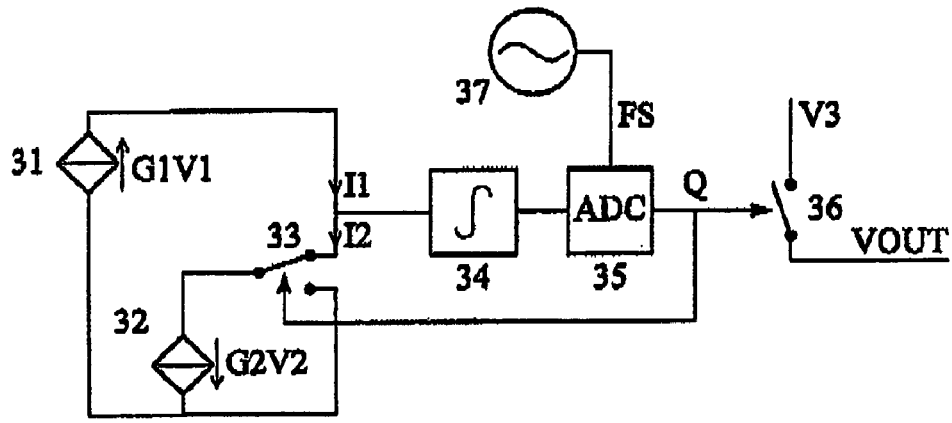
FIG. 9 shows a delta-sigma circuit implementation of the multiplier/divider of FIGS. 6 and 7.

A delta-sigma (ΔΣ) circuit implementation of the multiplier/divider block is shown in FIG. 9.

The DC transfer function of the ΔΣ in FIG. 9 is:

$$VOUT = \frac{G1}{G2}\frac{V1 \cdot V3}{V2} \qquad \text{Equation 9}$$

The transfer function of the ΔΣ is derived as follows. The input voltage V1 is transferred into a current I1 by the transconductance 31. The input voltage V2 is transferred into a current I2 by the transconductance 32 and the switch 33. The sum of the two currents is integrated in 34. The output of the integrator is quantized in 35 into a bitstream Q. The ADC 35 is clocked at time instants defined by the clock signal FS. The clock signal FS is generated by the oscillator 37. The bitstream is fed back to the input via the switch 33. This is a feedback system with an infinite gain at DC. Therefore the two currents I1 and I2 must be equal at DC.

$$Q \cdot G2 \cdot V2 = G1 \cdot V1 \qquad \text{Equation 10}$$

The voltage V3 is multiplied by bitstream Q with the switch 36. Therefore, the output voltage is:

$$VOUT = Q \cdot V3 \quad \text{Equation 11}$$

Solving for VOUT, using the equations Equation 10 and Equation 11, yields equation Equation 9.

Figure 10:
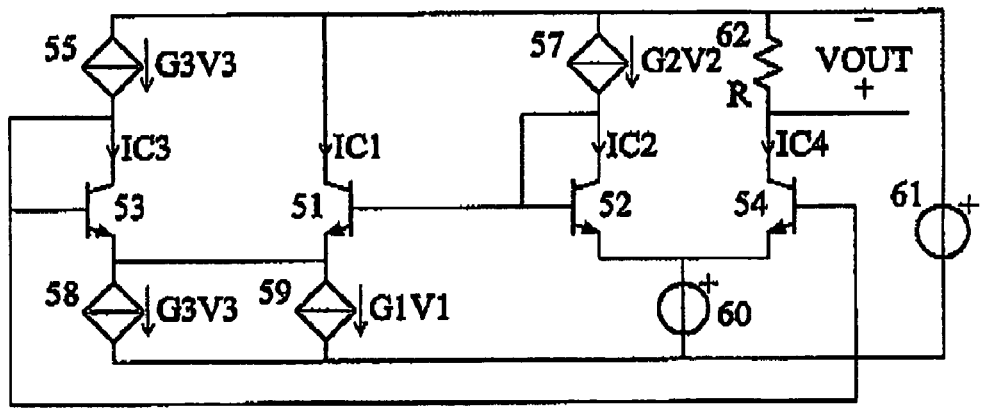
FIG. 10 shows a translinear circuit implementation of the multiplier/divider of FIGS. 6 and 7.

A translinear circuit implementation of the multiplier/divider block is shown in FIG. 10.

The transfer function of the translinear circuit in FIG. 10 is:

$$VOUT = R \cdot IC4 = R \frac{G1 \cdot G3}{G2} \frac{V1 \cdot V3}{V2} \quad \text{Equation 12}$$

The transfer function of the translinear circuit is derived as follows. The base-emitter diodes of the transistors 51-54 form a translinear loop. Assuming that the transistors has a zero base current and an infinite Early voltage, the relationship between the collector currents is:

$$IC1 \cdot IC3 = IC2 \cdot IC4 \quad \text{Equation 13}$$

It is helpful to consider the theory underlying the above equation.

Figure 13:
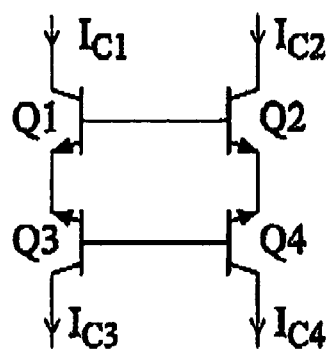
FIG. 13 illustrates a translinear circuit core.

The translinear circuit exploits the exponential relation between the collector current and the base-emitter voltage of bipolar transistors. A translinear core is shown in FIG. 13. The base-emitters of the four transistors form a voltage loop:

$$V_{BE1} - V_{BE2} + V_{BE3} - V_{BE4} = 0 \quad \text{Equation 14}$$

The base-emitter voltage is:

$$V_{BE} = V_T \ln \frac{I_C}{I_S} \quad \text{Equation 15}$$

By inserting Equation 15 in Equation 14, the relation of the collector currents can be expressed as:

$$\frac{I_{C1} \cdot I_{C3}}{I_{C2} \cdot I_{C4}} = 1 \quad \text{Equation 16}$$

However, this equation does not take into account for the base current and the Early voltage of the transistors.

Returning now to the translinear circuit, IC2 and IC3 are set by the transconductances 55 and 57 respectively. IC1 is set by the combined action of 55, 58, and 59. Because the emitter current of transistor 53 is cancelled by the transconductance 58 the collector current IC1 is set by the transconductance 59. The relations between the input voltages and the collector currents are:

$$\begin{cases} IC1 = G1 \cdot V1 \\ IC2 = G2 \cdot V2 \\ IC3 = G3 \cdot V3 \end{cases} \quad \text{Equation 17}$$

Solving for IC4, using the equations Equation 13 and Equation 17, yields equation Equation 12.

In the translinear circuit implementation of the multiplier/divider block, the voltage source 61 is the power supply and the voltage source 60 is used to bias the emitter voltages to an appropriate voltage.

Controller

Figure 11:
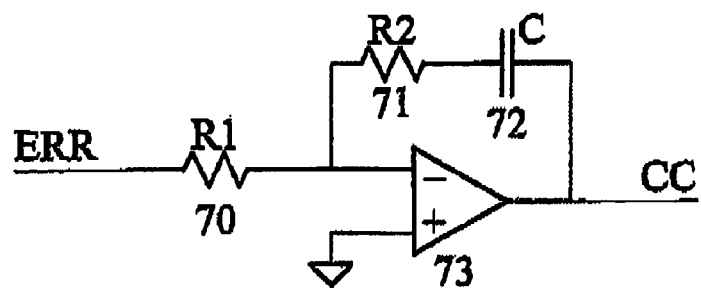
FIG. 11 shows an example implementation of the controller (CTRL) module of FIG. 1.

An example embodiment of the controller 26 of FIG. 1 is shown in FIG. 11. The main function of the controller is the integration of the ERR signal, performed by action of the resistor 70, the capacitor 72, and the amplifier 73. Together they form an inverting integrator. If the output current is too high, the error voltage ERR will be positive, and the signal CC will decrease which reduces the output power of the SMPS (and vice versa for a too low output current).

The purpose of resistor 71 is to cancel the residual pole from the CM 28 by inserting a zero. This way the transfer function from OC to CC only has one dominant pole at zero frequency.

Alternatively, the controller may be implemented without resistor 71 by replacing resistors 71 with a wire. In this alternative implementation of the controller, the low-pass filter 14 in the current module CM 28 is no longer required. In effect, removing the low-pass filter 14, i.e. letting the time constant $\tau_3$ go to zero, reduces the required value of the resistor 71 to zero.

Driver

The driver 25 in FIG. 1 may comprise a pulse-width and/or pulse-frequency modulator that controls the DRIVE signal. The DRIVE signal turns on and off the primary side switch 31. The width and frequency of the DRIVE signal controls the power delivered to the secondary side of the transformer 21. The input signal CC preferably controls the driver 25 such that the power delivered to the secondary side is linearly dependent on (increases monotonically with respect to) the input signal CC. For further details reference may be made to the applicant's co-pending applications PCT/GB2005/050244, PCT/GB2005/050242 and GB0526118.5 (all of which applications are hereby incorporated by reference in their entirety).

Broadly speaking, we will describe techniques for estimating current on the secondary side of a transformer in a switched mode power supply (SMPS) using low-pass filters. The techniques we describe average the primary-side current. The techniques may also average the charge and discharge signals.

Broadly speaking we have described a method of using low-pass filters to produce an output current model for a switch mode power supply and hence estimate the output current of the switch mode power supply, in particular by means of primary-side sensing. In some preferred embodiments the output current model may be implemented using switched-capacitor filters. In embodiments three signals are employed in order to create the output current model, the charge time of the primary side of the magnetic energy storage device (transformer), a primary winding current signal, and the discharge time of the secondary side. These signals may be generated using a voltage sense signal comprising a reflected voltage of the secondary of the transformer, a current sense signal that represents the current on the primary side, and a DRIVE signal that represents the on-time of the primary (power) switch. In preferred embodiments a controller for an SMPS uses this current model to control the secondary side output current of the SMPS.

However embodiments may also be employed in conjunction with a voltage control loop, preferably a primary-side sensing voltage control loop, to implement constant-voltage, constant-current control. We have previously described a number of different techniques which may be employed for output voltage regulation using primary side feedback, for example in UK patent applications numbers 0610206.5, 0610210.7, 0610208.1 and 0610211.5 all filed by the present applicant on 23 May 2006, all hereby incorporated by reference in their entirety. For example, in one technique a decaying peak detector is employed to provide a signal approximating a tangent to the decaying secondary side waveform (reflected in the primary or an auxiliary winding waveform), the output voltage being sampled at the knee in the reflected secondary side voltage waveform, at which point because substantially no current is flowing to the SMPS output the secondary side voltage accurately reflects the output voltage of the SMPS. In another technique the primary (or an auxiliary) voltage waveform is integrated from a point of known zero flux (and hence current) in the transformer immediately prior to switching on the power device, the point at which the integrated signal is again equal to zero corresponding to the next point at which the flux (and hence secondary current) in a transformer is zero. This signals at the point at which to sample the voltage on the auxiliary (or a primary) winding in order to obtain an accurate indication of the SMPS output voltage.

The operation of embodiments of the above-described output current estimation technique in the context of an example of an SMPS operating in a Discontinuous Conduction Mode (DCM) are described, but the techniques also work in Critical Conduction Mode and in Continuous Conduction Mode (CCM) since no particular shape is assumed for the waveforms involved; instead the described signal processing employs the actual, sensed signal waveforms.

No doubt many other effective alternatives will occur to the skilled person. It will be understood that the invention is not limited to the described embodiments and encompasses modifications apparent to those skilled in the art lying within the spirit and scope of the claims appended hereto.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

All documents, patents, and other references listed above are hereby incorporated by reference for any purpose. However, were any statement of these incorporated documents conflicts with the present disclosure, the present disclosure governs interpretation.

We claim:

1. A system for estimating the output current of a Switch Mode Power Supply (SMPS), the SMPS including a transformer with at least a primary winding coupled to an input of the SMPS and a secondary winding coupled to an output of the SMPS and having a power switching device to switch power to the primary winding of the transformer, the system comprising:

a primary current sense input to sense a primary current in the primary winding of the transformer;

a charge signal input to sense a charge signal dependent on a charging time of the transformer;

a discharge signal input to sense a discharge signal dependent on a discharging time of the transformer;

at least one averager; and a calculator;

wherein the primary current is averaged by the averager over at least a switching cycle of the SMPS; and wherein the calculator estimates the output current of the SMPS using the averaged primary current, the charge signal and the discharge signal.

2. The system of claim 1, wherein each of the charge and discharge signals are averaged over at least a switching cycle of the SMPS by an averager.

3. A system according to claim 1, wherein the calculator estimates the output current of the SMPS by dividing a multiplied product of the averaged primary current and the discharge signal by the charge signal.

4. A system according to claim 1, wherein the calculator comprises a multiplier and divider comprising a plurality of inputs to receive a plurality of input signals, and the multiplier and divider to multiply and divide the input signals to produce an output signal.

5. A system according to claim 4, wherein the multiplier and divider is a delta-sigma circuit.

6. A system according to claim 4, wherein the multiplier and divider is a translinear circuit.

7. A system according to claim 1, wherein the averager is a low-pass filter.

8. A system according to claim 7, wherein the low-pass filter is a switched-capacitor filter.

9. A method of estimating the output current of a Switched Mode Power Supply (SMPS), the SMPS including a transformer with at least a primary winding coupled to an input of the SMPS and a secondary winding coupled to an output of the SMPS and having a power switching device to switch power to the primary winding of the transformer, the method comprising:

sensing a primary current in the primary winding of the transformer;

sensing a charge signal that depends on a charging time of the transformer;

sensing a discharge signal that depends on a discharging time of the transformer;

averaging the primary current over at least a switching cycle of the SMPS; and calculating the output current of the SMPS using each of the averaged primary current, the charge signal, the discharge signal.

10. The method of claim 9, wherein each of the charge and discharge signals are averaged over at least a switching cycle of the SMPS.

11. The method of claim 9, wherein the calculation comprises:

dividing a product of the averaged primary current and the discharge signal by the charge signal.

12. A system for producing an error signal for controlling the output current of a Switch Mode Power Supply (SMPS), the SMPS including a transformer with at least a primary winding coupled to an input of the SMPS and a secondary winding coupled to an output of the SMPS and having a power switching device to switch power to the primary winding of the transformer, the system comprising:

a primary current sense input to sense a primary current in the primary winding of the transformer;

a charge signal input to sense a charge signal dependent on a charging time of the transformer;

a discharge signal input to sense a discharge signal depending on a discharging time of the transformer;

a desired output current signal input to sense a desired output current;

at least one averager; and a calculator;

wherein the primary current is averaged by the averager over a switching cycle of the SMPS, and wherein the calculator produces an error signal using the averaged primary current, the charge signal, the discharge signal and the desired output current.

13. The system of claim 12, wherein each of the charge and discharge signals are averaged over at least a switching cycle of the SMPS by an averager.

14. The system of claim 12, wherein the calculator calculates the error signal by:

dividing a product of the averaged primary current and the discharge signal by the charge signal; and subtracting the desired output current signal from the divided product.

15. The system of claim 12, wherein the calculator calculates the error signal by:

dividing a product of the desired output current signal and the charge signal by the discharge signal; and subtracting the divided product from the averaged primary current.

16. The system of claim 12, wherein the calculator calculates the error signal by:

subtracting a product of the desired output current signal and the charge signal from a product of the averaged primary current and the discharge signal.

17. The system according to claim 12, wherein the calculator comprises a multiplier and divider comprising a plurality of inputs to receive a plurality of input signals, and the multiplier and divider to multiply and divide the input signals to produce an output signal.

18. The system according to claim 17, wherein the multiplier and divider is a delta-sigma circuit.

19. The system according to claim 17, wherein the multiplier and divider is a translinear circuit.

20. A system according to claim 12, wherein the averager is a low-pass filter.

21. A system according to claim 20, wherein the low-pass filter is a switched-capacitor filter.

22. A method for producing an error signal for controlling the output current of a Switch Mode Power Supply (SMPS), the SMPS including a transformer with at least a primary winding coupled to an input of the SMPS and a secondary winding coupled to an output of the SMPS and having a power switching device to switch power to the primary winding of the transformer, the method comprising:

receiving a primary current in the primary winding of the transformer;

receiving a charge signal, the charge signal depending on a charging time of the transformer;

receiving a discharge signal, the discharge signal depending on a discharging time of the transformer;

receiving a desired output current input signal;

averaging the primary current over at least a switching cycle of the SMPS; and calculating an error signal for controlling the output current of the SMPS using each of the averaged primary current, the charge signal, the discharge signal and the desired output current signal.

23. The method of claim 22, wherein each of the charge and discharge signals are averaged over at least a switching cycle of the SMPS.

24. The method according to claim 22, wherein the calculation comprises:

dividing the product of the averaged primary current and the discharge signal by the charge signal; and subtracting the desired output current signal from the divided product.

25. The method according to claim 22, wherein the calculation comprises:

dividing a product of the desired output current signal and the charge signal by the discharge signal; and subtracting the divided product from the averaged primary current.

26. The method according to claim 22, wherein the calculation comprises:

subtracting the product of the desired output current signal and the charge signal from the product of the averaged primary current and the discharge signal.

27. A system comprising a controller for controlling the output current of a Switch Mode Power Supply (SMPS):

a primary current sense input to sense a primary current in the primary winding of the transformer;

a charge signal input to sense a charge signal dependent on a charging time of the transformer;

a discharge signal input to sense a discharge signal depending on a discharging time of the transformer;

a desired output current signal input to sense a desired output current;

at least one averager; and a calculator;

wherein the primary current is averaged by the averager over a switching cycle of the SMPS, wherein the calculator produces an error signal using the averaged primary current, the charge signal, the discharge signal and the desired output current and wherein the output current of the SMPS is regulated in response to the error signal.

28. A controller according to claim 27, further comprising a module to estimate an output voltage of the SMPS.

29. A controller according to claim 28, wherein the module receives a voltage-sense signal from a winding on the primary side of the transformer that represents a signal on the secondary side of the transformer, and wherein the module estimates the output voltage of the SMPS using the voltage-sense signal.

30. A controller according to claim 29, wherein the voltage-sense signal and the estimated output voltage of the SNIPS are compared to produce the discharge signal.

31. A controller according to claim 27, wherein the charge signal is dependent on a drive signal that represents an on-time of the power switching device.

32. A system for regulating the output current of a Switch Mode Power Supply, comprising:
   means for calculating an error signal using an averaged primary current signal from a primary winding of a transformer comprising the SMPS, a charge signal depending on the charging time of the transformer, a discharge signal dependent on a discharging time of the transformer, and a desired output current input signal;
   means for regulating the output current of a SMPS in response to the error signal.

33. A Switch Mode Power Supply (SMPS), comprising:
   a transformer having at least a primary winding coupled to an input of the SMPS and a secondary winding coupled to an output of the SMPS;
   a switch that electrically couples and decouples the primary winding of the transformer to a power source; and
   a system comprising:
      a primary current sense input to sense a primary current in the primary winding of the transformer;
      a charge signal input to sense a charge signal dependent on a charging time of the transformer;
      a discharge signal input to sense a discharge signal depending on a discharging time of the transformer;
      a desired output current signal input to sense a desired output current;
      at least one averager; and
      a calculator;
   wherein the primary current is averaged by the averager over a switching cycle of the SMPS, and
   wherein the calculator produces an error signal using the averaged primary current, the charge signal, the discharge signal and the desired output current,
   wherein the switch is controlled in response to the error signal produced by the system in order to control the current coupled to the output of the SMPS.

34. A system comprising a multiplier and divider for use in a Switch Mode Power Supply (SMPS):
   a plurality of inputs for receiving a plurality of input signals;
   an output;
   a dividing stage receiving at least two input signals, the dividing stage including a delta-sigma circuit having an integrator for integrating a sum of the at least two input signals into an integrated signal, a quantiser to quantise the integrated signal into a quantised signal that is representative of a quotient of the at least two input signals, a switching device disposed between one of the at least two input signals, and including a control input coupled to a feedback path, wherein the quantised signal is fed back via the feedback path to selectively couple and decouple the one of the at least to input signals to the input of the delta-sigma circuit; and
   a multiplying stage receiving at least one other input signal and to multiply the at least one other input signal by the quantised signal to produce an output.

35. A multiplier and divider according to claim 34, wherein the multiplying stage includes a switching device coupled between the at least one other input signal and an output of the multiplier and divider, the switching device comprising a control input receiving the divided signal from the dividing stage to provide the multiplied output.

36. A multiplier and divider according to claim 34, further comprising a switching device disposed between one of the at least two input signals to the input of the delta-sigma circuit, and comprising a control input coupled to the feedback path of the delta-sigma circuit, wherein the divided signal is fed back via the feedback path to control the switching device to selectively couple and decouple the one of the at least two input signals to the input of the delta-sigma circuit.

* * * * *